United States Patent [19]

Ewertz et al.

[11] Patent Number: 5,371,876
[45] Date of Patent: Dec. 6, 1994

[54] COMPUTER SYSTEM WITH A PAGED NON-VOLATILE MEMORY

[75] Inventors: James H. Ewertz; Orville H. Christeson, both of Portland; Douglas L. Gabe, Aloha; Sean T. Murphy, Portland, all of Oreg.

[73] Assignee: Intel Corporation, Santa Clara, Calif.

[21] Appl. No.: 137,376

[22] Filed: Oct. 14, 1993

Related U.S. Application Data

[63] Continuation of Ser. No. 698,318, May 10, 1991, abandoned.

[51] Int. Cl.$^5$ ............................................. G06F 12/02
[52] U.S. Cl. .......................... 395/425; 364/DIG. 1; 364/245.31; 364/246.11; 364/254.3; 395/400
[58] Field of Search ... 364/200 MS File, 900 MS File; 395/400, 425

[56] References Cited

U.S. PATENT DOCUMENTS

| | | | |
|---|---|---|---|
| 4,153,937 | 5/1979 | Poland | 364/706 |
| 4,290,104 | 9/1981 | Holtey et al. | 395/400 |
| 4,374,417 | 2/1983 | Bradley et al. | 395/400 |
| 4,441,155 | 4/1984 | Fletcher et al. | 395/400 |
| 4,443,847 | 4/1984 | Bradley et al. | 395/425 |
| 4,608,632 | 8/1986 | Kummer | 395/425 |
| 4,831,522 | 5/1989 | Henderson et al. | 395/425 |
| 5,053,990 | 10/1991 | Kreifels et al. | 395/425 |
| 5,117,492 | 5/1992 | Nash | 395/400 |

*Primary Examiner*—Joseph L. Dixon
*Assistant Examiner*—Hiep T. Nguyen
*Attorney, Agent, or Firm*—Blakely, Sokoloff, Taylor & Zafman

[57] ABSTRACT

A computer system wherein a paging technique is used to expand the usable non-volatile memory capacity beyond a fixed address space limitation. The computer system of the preferred embodiment includes a flash memory component for storing non-volatile code and data including a system BIOS in the upper 128K of memory. The useful BIOS memory space is effectively increased while maintaining the address boundary of the upper 128K region. The address space of the non-volatile memory device is logically separated into distinct pages of memory (Pages 1-4). Page 1, Page 3 and Page 4 may be individually swapped into the address space originally occupied by Page 1 (the swappable page area). In the preferred embodiment, Page 2 is held static and thus is not used as a swap area. Each of the swappable pages contain processing logic called swapping logic used during the swapping or paging operation. The swapping logic operates in conjunction with paging hardware to effect the swapping of pages into the swappable page area. The high order processor address lines are input by a page decoder. The page decoder is used to modify the address actually presented to the non-volatile memory device. A page register is used by the processor to select a page in non-volatile memory. In an alternative embodiment, several different forms of configuration or identification information may be stored in a page of non-volatile memory.

27 Claims, 11 Drawing Sheets

COMPUTER SYSTEM WITH A PAGED NON-VOLATILE MEMORY

This is a continuation of application Ser. No. 07/698,318, filed May 10, 1991, now abandoned.

FIELD OF THE INVENTION

The present invention relates to the field of computer systems. Specifically, the present invention relates to the field of computer system architectures incorporating a non-volatile form of basic operating system processing logic.

BACKGROUND OF THE INVENTION

Many prior art computer systems are typically configured at a minimum with a processor, a random access memory device, and a read only memory device. Some systems, such as a variety of calculators, may operate with only a processor and a read only memory device. Read only memory devices (ROM) provide a non-volatile form of memory that is not destroyed when power is removed from the computer system.

Prior art computer systems are typically bootstrapped (i.e. power up initialized) using the processing logic (i.e. firmware) stored within the read only memory device internal to the computer system. Since the read only memory device is non-volatile, the firmware within ROM is guaranteed to contain valid data or instructions; thus, the prior art computer system can be reliably bootstrapped using firmware within ROM. Many computer systems have successfully used this technique. One such system is the IBM Personal Computer (PC) developed by the IBM Corporation of Armonk, N.Y. Prior art versions of the IBM PC use read only memory devices for storage of firmware or a basic input/output system (BIOS) software program. The BIOS is an operating system that provides the lowest level of software control over the hardware and resources of the computer system. ROM storage may also be used for non-volatile retention of network configuration data or application specific data. ROM devices in the prior art include basic read only memory devices (ROM), programmable read only memory devices (PROM), and erasable programmable read only memory devices (EPROM). Battery-backed random access memory devices such as CMOS RAM devices may also be used for non-volatile retention of network configuration data or application specific data in a computer system.

Although ROM-based computer systems have been very successful in the prior art, a number of problems exist with the use of these devices in a computer system. Most computer systems have a finite address space in which each of the computer system resources must operate. These resources include ROM, random access memory (RAM), input/output devices, and possibly other processors. ROM devices with a BIOS contained therein are typically constrained to a specific address range within the address space available. In order to maintain compatibility with a particular computer architecture, designers and developers in the computer industry create products in reliance on a particular ROM address standard. For example, the IBM PC AT architecture mandates that the ROM BIOS and other firmware based applications are limited to a 128K address space at the top of the first megabyte of memory. With this architecture, however, the ROM BIOS cannot exceed 128K of ROM space. Within this ROM space, the BIOS must contain processing logic for initializing and controlling many of the hardware systems and resources of the computer system. With the increased functionality of model computer systems, the complexity of hardware systems and resources increases as does the quantity of BIOS code required to support them. Also, because of new technologies and capabilities such as Extended Industry Standard Architecture (EISA) systems, flash memory and multi-language support for international operation of a computer system, it is becoming increasingly unfeasible to fit all desired BIOS features within the 128K boundary of the IBM PC AT architecture. Other varieties of computer systems typically have an established limit for the size of their BIOS. Even though the need for expanding the BIOS boundary is growing, the boundary cannot be arbitrarily modified without losing compatibility with established standards.

Thus, a means for expanding the useable BIOS memory space without violating established BIOS address boundary standards is needed.

SUMMARY OF THE INVENTION

The present invention is a computer system wherein a paging technique is used to expand the useable non-volatile memory capacity beyond a fixed address space limitation. The computer system of the preferred embodiment comprises a bus for communicating information, a processor coupled with the bus for processing information, a random access memory device coupled with the bus for storing information and instructions for the processor, an input device such as an alpha numeric input device or a cursor control device coupled to the bus for communicating information and command selections to the processor, a display device coupled to the bus for displaying information to a computer user, and a data storage device such as a magnetic disk and disk drive coupled with the bus for storing information and instructions. In addition, the computer system of the preferred embodiment includes a flash memory component coupled to the bus for storing non-volatile code and data. Devices oilier than flash memory may be used for storing non-volatile code and data. Using the present invention, a paging technique expands the useable non-volatile memory capacity beyond a fixed address space limitation.

The flash memory device used in the preferred embodiment contains four separately erasable/programmable non-symmetrical blocks of memory. One of these four blocks may be electronically locked to prevent erasure or modification of its contents once it is installed. This configuration allows the processing logic of the computer system to update or modify any selected block of memory without affecting the contents of other blocks. One memory block contains a normal BIOS. The BIOS comprises processing logic instructions that are executed by the processor.

In the preferred embodiment, the BIOS is constrained to the upper 128K of the first Mbyte of the addressable memory space in the computer system. Because of computer system design constraints and compatibility, the BIOS may not occupy locations outside of the upper 128K region. In the present invention, the useful BIOS memory space is effectively increased while maintaining the 128K boundary of the upper 128K region. This enlargement of the useable BIOS space is realized using the paging technique of the present invention. In the preferred embodiment, the address space of the non-volatile memory device is logically separated into four distinct 64K byte pages of memory (Pages 1-4). Using the apparatus and techniques of the present invention, Page 1, Page 3 and Page 4 may be individually swapped into the address space occupied by the BIOS (the swappable page area). In the preferred embodiment, Page 2 is held static and thus is not used as a swap area.

Each of the swappable pages, Page 1, Page 3, and Page 4, contain processing logic called swapping logic used during the swapping or paging operation. The swapping logic operates in conjunction with paging hardware to effect the swapping of pages into the region occupied by the BIOS. The high order processor address lines are input by a page decoder. The page decoder is used to modify the address actually presented to the non-volatile memory device. A page register provides a means by which the processor may select a page in non-volatile memory.

In an alternative embodiment of the present invention, several different forms of configuration or identification information may be stored in a page of non-volatile memory. Configuration information in this form may include EISA configuration data, other bus protocol information or network information. Identification information may include an Ethernet address, system serial numbers, or software license numbers.

It is therefore an object of the present invention to provide a means for expanding the memory capacity for the BIOS while maintaining address space boundaries. It is a further object of the present invention to provide a means for paging a system BIOS in a computer system. It is a further object of the present invention to provide a means for selecting a particular page of BIOS memory. It is a further object of the present invention to provide a means for swapping pages of BIOS. It is a further object of the present invention to provide a means for using page-resident processing logic for controlling the page swapping operation. It is a further object of the present invention to provide a means for maintaining at least one static page. It is a further object of the present invention to provide a means for storing configuration or identification information. It is a further object of the present invention to provide a means for storing and retrieving EISA information in flash memory.

These and other objects of the present invention will become apparent as presented and described in the following detailed description of the preferred embodiment.

DETAILED DESCRIPTION OF THE PREFERRED EMBODIMENT

The present invention is a computer system wherein a paging technique is used to expand the useable non-volatile memory capacity beyond a fixed address space limitation. In the following description, numerous specific details are set forth in order to provide a thorough understanding of the invention, however, it will be apparent to one of ordinary skill in the art that these specific details need not be used to practice the present invention. In other instances, well known structures, circuits, and interfaces have not been shown in detail in order not to unnecessarily obscure the present invention.

Figure 1:
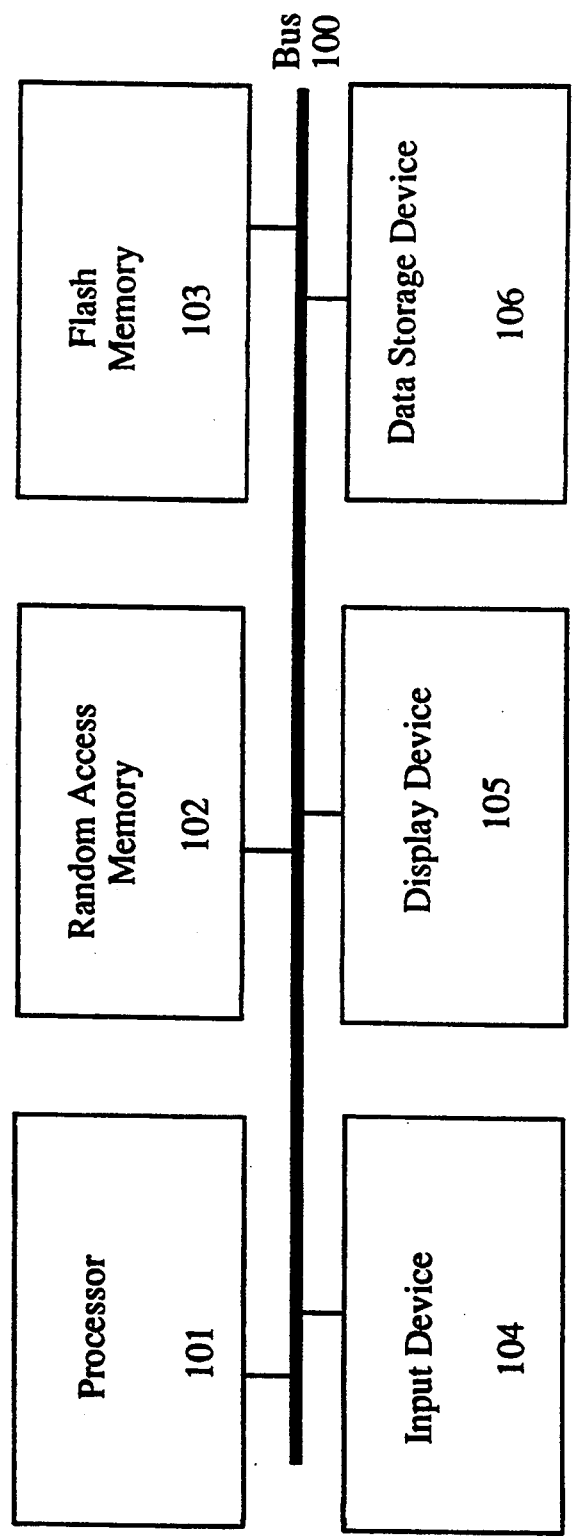
FIG. 1 is art illustration of the computer system of the present invention.

Referring to FIG. 1, a block diagram of the architecture of the computer system of the present invention is illustrated. The preferred embodiment of the present invention is implemented using an 80386 or 80486 microprocessor manufactured by the Assignee of the present invention. It will be apparent to those of ordinary skill in the art, however, that alternative processors and computer system architectures may be employed. In general, such computer systems as illustrated by FIG. 1 comprise a bus 100 for communicating information, a processor 101 coupled with the bus for processing information, a random access memory device 102 coupled with bus 100 for storing information and instructions for the processor 101, an input device 104 such as an alphanumeric input device or a cursor control device coupled to the bus 100 for communicating information and command selections to the processor 101, a display device 105 coupled to the bus 100 for displaying information to a computer user, and a data storage device such as a magnetic disk and disk drive coupled with the bus 100 for storing information and instructions.

In addition, the computer system of the preferred embodiment includes a read only memory component 103 coupled to the bus 100 for storing non-volatile code and data. In the preferred embodiment, read only memory device 103 is a flash memory component well known in the art.

Several types of non-volatile memory devices currently existing in the art may be reprogrammed without removing the device from a circuit board on which the device is installed. One class of reprogrammable non-volatile memory devices is flash memory. Several different types of flash memory devices exist in the art. Using a dedicated set of electrical signals, the contents of flash memory may be erased and reprogrammed with new data. Many prior art flash memory devices only allow complete erasure and reprogramming of all memory locations of tile device. Other flash memory devices, however, are partitioned into separately erasable and programmable blocks of memory in a single flash memory device. In the preferred embodiment of the present invention, such a partitioned flash memory device is used. In the preferred embodiment, two flash memory devices denoted 28F001BT are used. The 28F001BT flash memory devices are 1M bit memory devices manufactured by the Assignee of the present invention. It will be apparent to those skilled in the art that other forms of reprogrammable non-volatile memory devices may be used with the invention taught herein. One example of such a non-flash device is an electrically erasable programmable read only memory (EEPROM).

The flash memory device used in the preferred embodiment contains four separately erasable/programmable non-symmetrical blocks of memory. One of these four blocks may be electronically locked to prevent erasure or modification of its contents once it is installed. This configuration allows the processing logic of the computer system to update or modify any selected block of memory without affecting the contents of other blocks. The dynamic updating of a selected area of non-volatile memory is the subject of a co-pending patent application Ser. No. 07/695,952, filed May 6, 1991, and assigned to the Assignee of the present invention.

In the preferred embodiment, a basic input/output system (BIOS) is stored in flash memory 103. In addition, other system and application specific processing logic and data parameters may also be stored in flash memory 103. The following sections describe how the contents of flash memory 103 may be paged in a manner allowing the effective size of the flash memory 103 to increase without expanding accesses beyond a fixed address boundary. It will be apparent to those skilled in the art that the paged flash memory technique of the present invention may be used in a computer system using any type of non-volatile memory and is not limited to a system employing flash memory.

Figure 2:
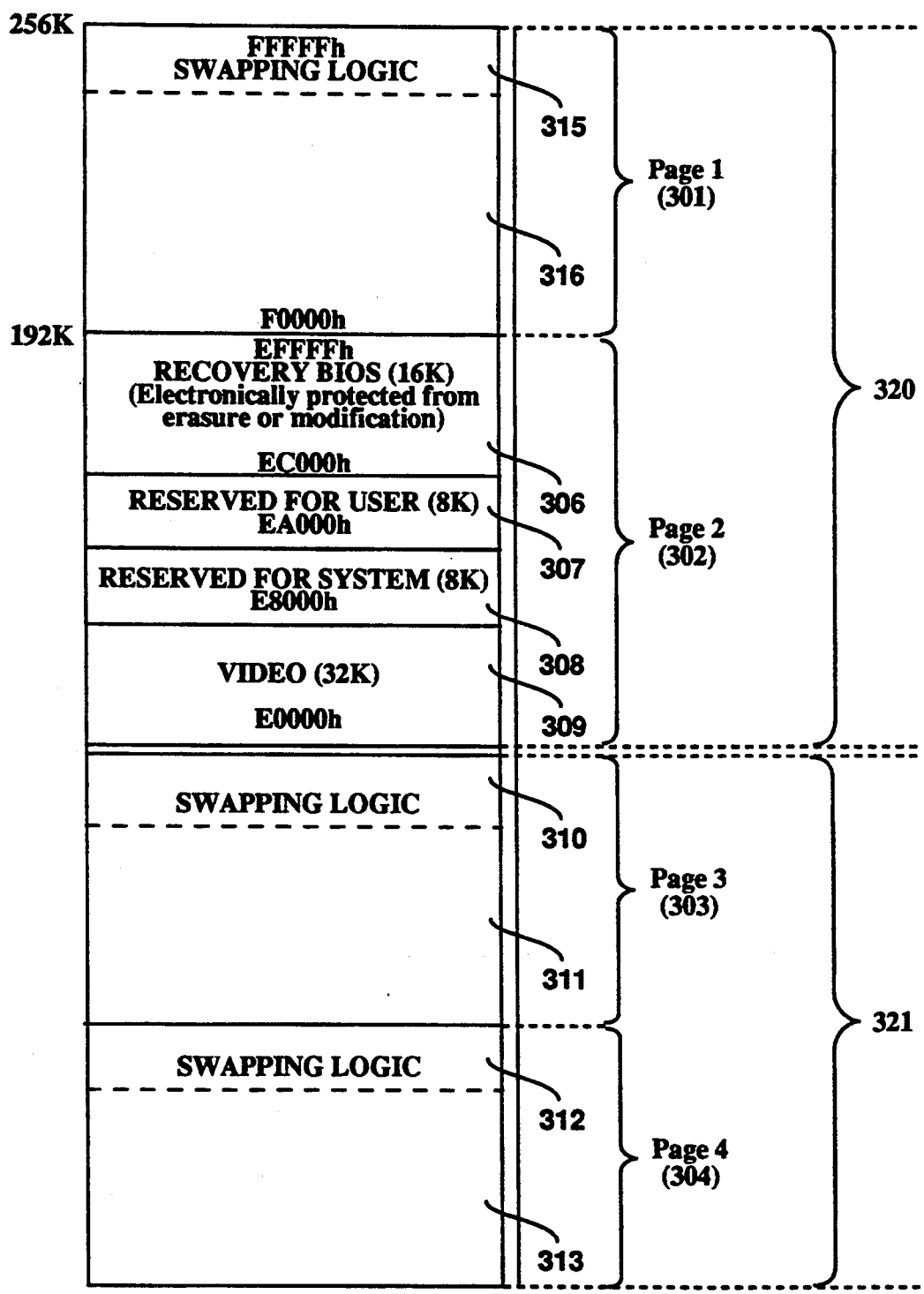
FIG. 2 is an illustration of the pages of BIOS used in the preferred embodiment.

Referring to the preferred embodiment illustrated in FIG. 2, a paged BIOS memory map of the contents of flash memory 103 is depicted. In the preferred embodiment, the BIOS is constrained to the upper 128K of the first Mbyte of the addressable memory space in the computer system. This address space is identified by region 320 illustrated in FIG. 2. In the prior art, the 128K region 320 is used for storage of the BIOS. The upper region 301 is used for storage of the normal system BIOS while the lower region 302 is used for storage of other logic and data such as overflow BIOS code and/or data, video or other BIOS's, setup code or data, and other information or logic.

In the present invention, the useful BIOS memory space is effectively increased while maintaining the 128K boundary of region 320. This enlargement of the useable BIOS space is realized using the paging technique of the present invention. In the preferred embodiment, the memory map illustrated in FIG. 2 is logically separated into four distinct 64K byte pages of memory. These pages are denoted Page 1 (301), Page 2 (302), Page 3 (303), and Page 4 (304). Using the apparatus and techniques of the present invention, Page 3 (303) and Page 4 (304) may be individually swapped into the address space occupied by Page 1 (301). In the preferred embodiment, Page 2 (302) is held static and thus is not used as a swap area.

It will be apparent to those skilled in the art that the 64K byte page size of the preferred embodiment may be implemented as a different page size in order to better accommodate an alternative embodiment. The techniques of the present invention, however, may still be used with a different page size. Similarly, the preferred embodiment defines two swappable pages, page 3 (303) and page 4 (304), outside of the 128K boundary of region 320. It will be apparent to those skilled in the art that additional pages may be defined using the techniques of the present invention in order to further enlarge the useable area of the BIOS.

Each of the swappable pages, Page 1 (301), Page 3 (303), and Page 4 (304), contain processing logic called swapping logic used during the swapping or paging operation. For example, the swapping logic for Page 1 (301) occupies a location in region 315. Similarly, each swappable page has swapping logic that resides in a fixed location relative to each page. The swapping logic operates in conjunction with paging hardware to effect the swapping of pages into the region occupied by Page 1 (301). The operation of the swapping logic is described below in relation to the flow charts of FIGS. 4 and 5. The paging hardware of the present invention is described next.

Figure 3:
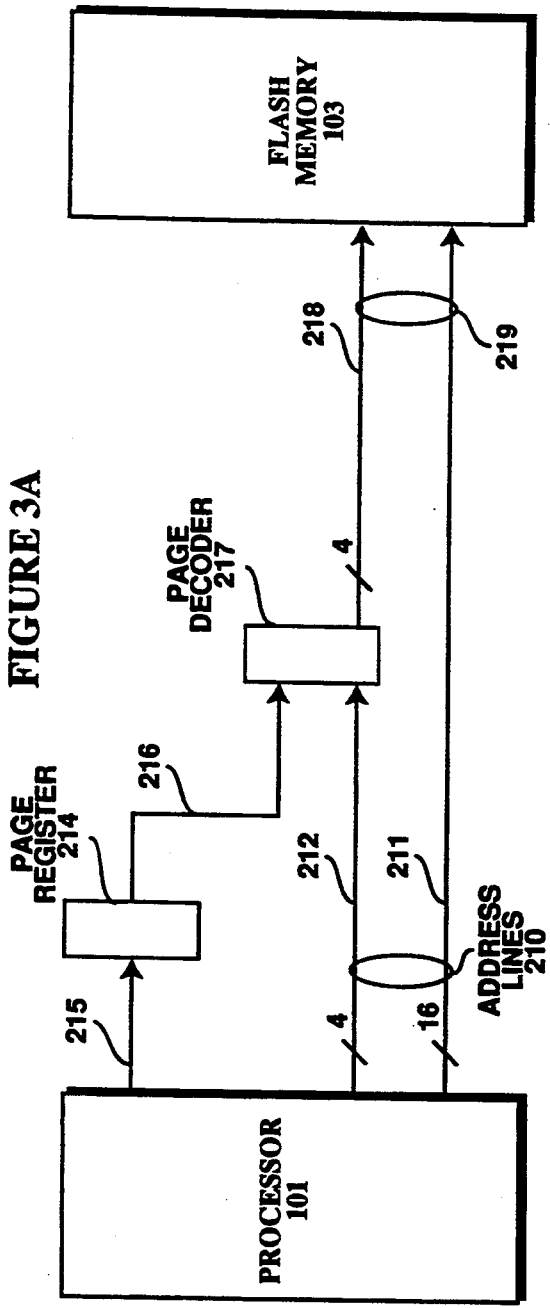
FIGS. 3a and 3b illustrate the paging hardware used in the present invention.

Referring now to FIG. 3a, a block diagram of the paging hardware of the present invention is illustrated. A portion of the interface between processor 101 and non-volatile memory or flash device 103 is an address presented to flash memory and/or decoder logic on address lines 210. The address signals thus presented define the location in flash memory 103 accessed by processor 101. For purposes of illustration, address lines 210 are shown separated into two components. The address signals on lines 211 comprise the low-order 16 bits of the address output by processor 101. Higher-order address signals are output on line 212. It will be apparent to those skilled in the art that the number of high order address signals presented on line 212 depends on the address width of processor 101. For purposes of illustration, only four address signals or bits are shown on line 212 in order to illustrate an access to the highest order location of flash memory 103.

The four address lines on line 212 in the preferred embodiment are input by a page decoder 217. Page decoder 217 is used to modify the address actually presented to flash memory 103 on address lines 219. A second input to page decoder 217 comes from a page register 214 on line 216. Page register 214 provides a means by which processor 101 may select a page in flash memory 103. Processor 101 selects a page by outputting a binary value on lines 215 that corresponds to the desired page. In the preferred embodiment, the output on line 215 to page register 214 is performed using an OUT instruction provided in the instruction set of processor 101. The use of an OUT instruction for loading an external register in this manner is well known in the art. Once page register 214 is loaded with a page number, this page number is provided to page decoder 217 on line 216.

Page decoder 217 manipulates the address actually presented to flash memory 103 on address lines 219 by first reading the high order processor address bits received on lines 212. If the value represented by the high order processor address bits on lines 212 defines a processor access to the swappable page area (i.e. address range F0000h through FFFFFh), page decoder 217 then reads the page number stored in page register 214. The page number is used to replace the value of the high order processor address actually output to flash memory 103 on address lines 219. In this manner, a processor access to the swappable page area can be redirected to a pre-determined page. If the value represented by the high order processor address bits on lines 212 defines a processor access to an area of flash memory other than the swappable page area, the page decoder 217 does not need to read the page register and the processor address is passed through unmodified to the flash memory device 103.

Figure 7A:
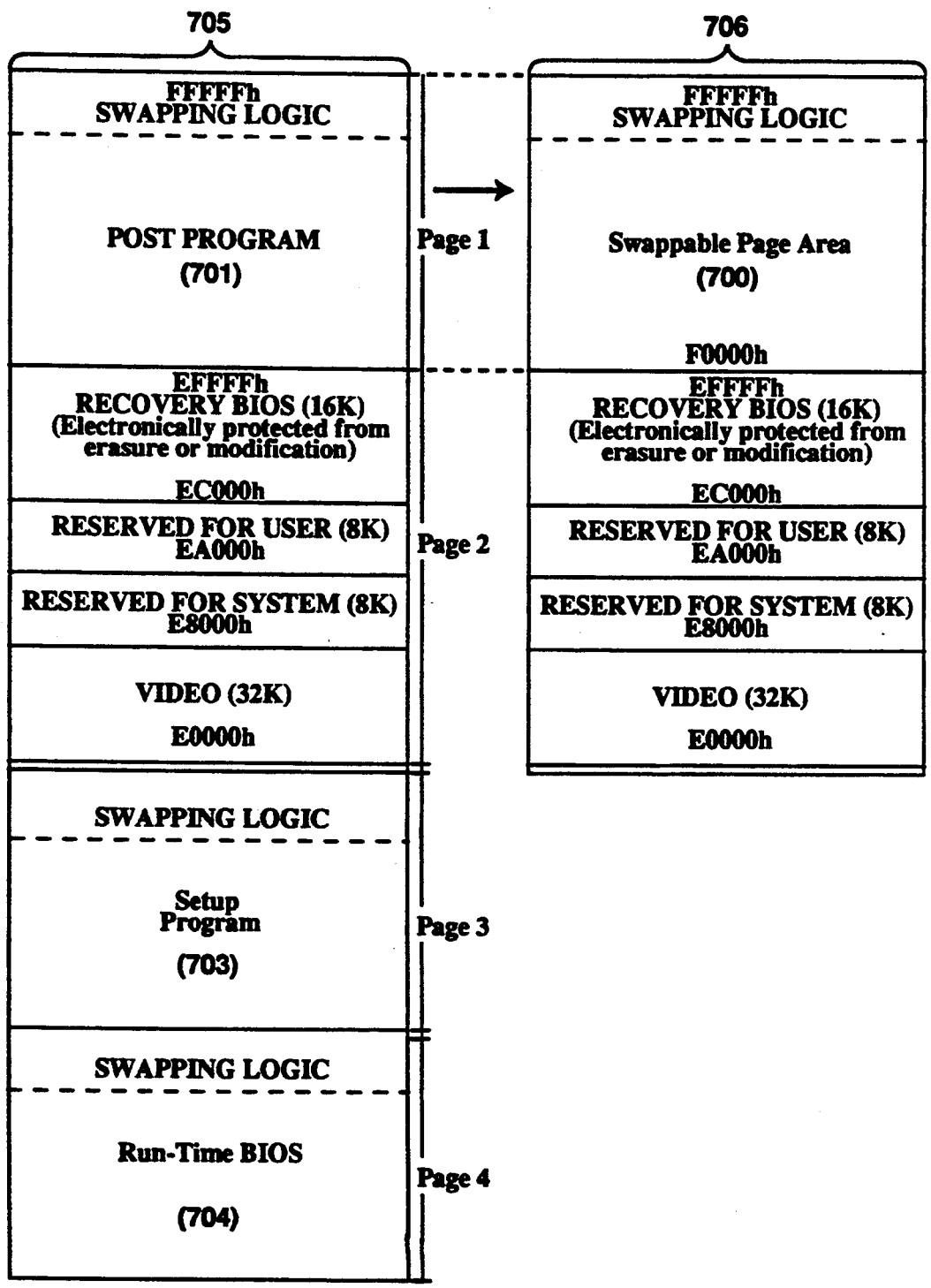
FIGS. 7a through 7d illustrate a memory map in various paging configurations.

An example of the operation of page register 214 and page decoder 217 is illustrated in FIG. 3b. If a value corresponding to Page 1 is loaded in page register 214 by processor 101 and a processor address in the swappable page range F0000h through FFFFFh is presented by processor 101 on lines 211 and 212, high order processor address bits 16–19 output by processor 101 on lines 212 each take a binary value of 1, thereby defining an address range of F0000h through FFFFFh. Because processor 101 has accessed the swappable page area, page decoder 217 is enabled to read page register 214 for the value stored therein. In this example, page decoder 217 reads a value corresponding to Page 1 and replaces the high order processor address with the Page 1 value. Thus, a flash memory address in the ravage of F0000h through FFFFFh is presented to the flash memory 103. This address range (F0000h through FFFFFh) corresponds to Page 1 (301) illustrated in FIG. 2. Because Page 1 was already located in the swappable page address space, no other page needed to be swapped in. Thus, for the simple case of Page 1, the processor address was essentially passed through to flash memory 103, even though the page decoder 217 still performed the address modification. This case is illustrated in FIG. 7a.

Figure 7B:
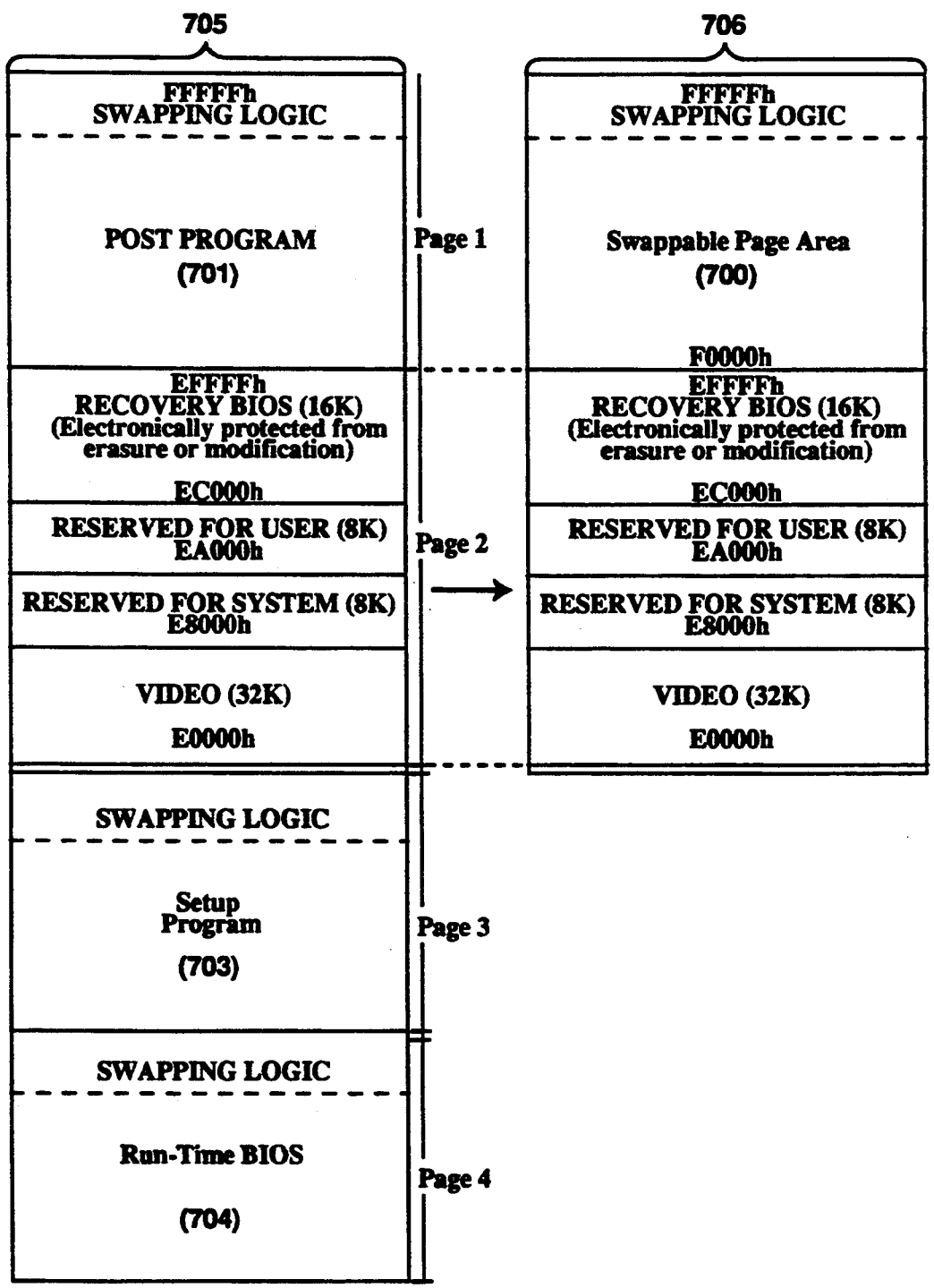

In the preferred embodiment, Page 2 will never be loaded in page register 214, since this is a non-swappable page. Thus a processor access to the non-swappable address area (E0000h through EFFFFh) does not produce address modification by page decoder 217. This case is illustrated in FIG. 7b.

Figure 7C:
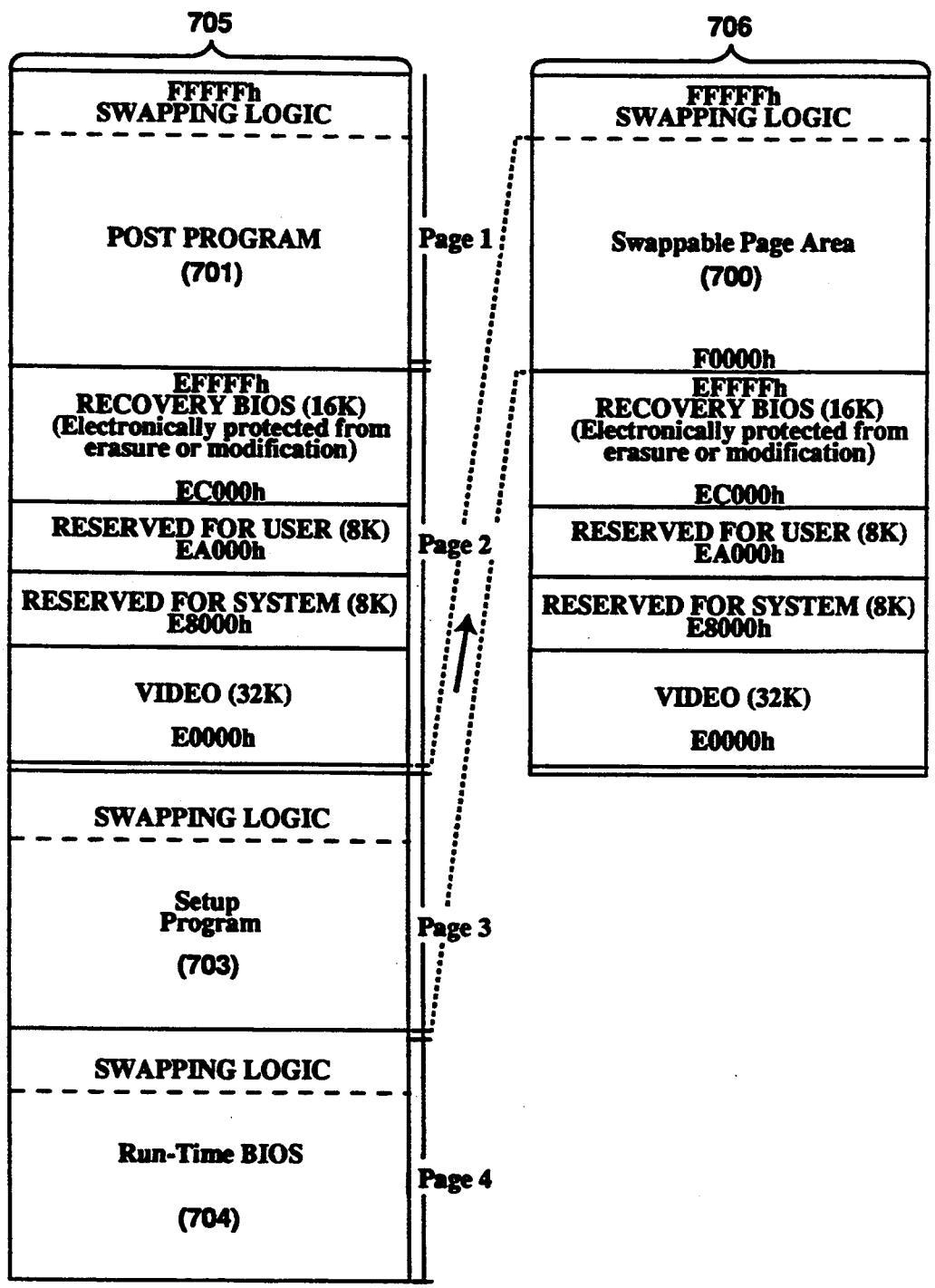

Referring now to the Page 3 example illustrated in FIG. 3b, page register 214 is loaded with a value corresponding to Page 3. A processor address in the swappable page range F0000h through FFFFFh is presented by processor 101 on lines 211 and 212. In this case, page decoder 217 reads the Page 3 value from page register 214 and replaces the high order processor address with the Page 3 value. This address modification results in a redirection of the processor address to a different address in flash memory 103 corresponding to the location of Page 3. In the example of FIG. 3b, the Page 3 value is 0Dh. This value redirects the Page 3 access to the flash memory address range D0000h through DFFFFh. It will be apparent to those skilled in the art that the processor memory access may be redirected to any area of flash memory 103. Other alternative embodiments may use a different Page 3 value and thereby redirect a Page 3 access to a different location in flash memory 103. The Page 3 case is illustrated in FIG. 7c.

Figure 7D:
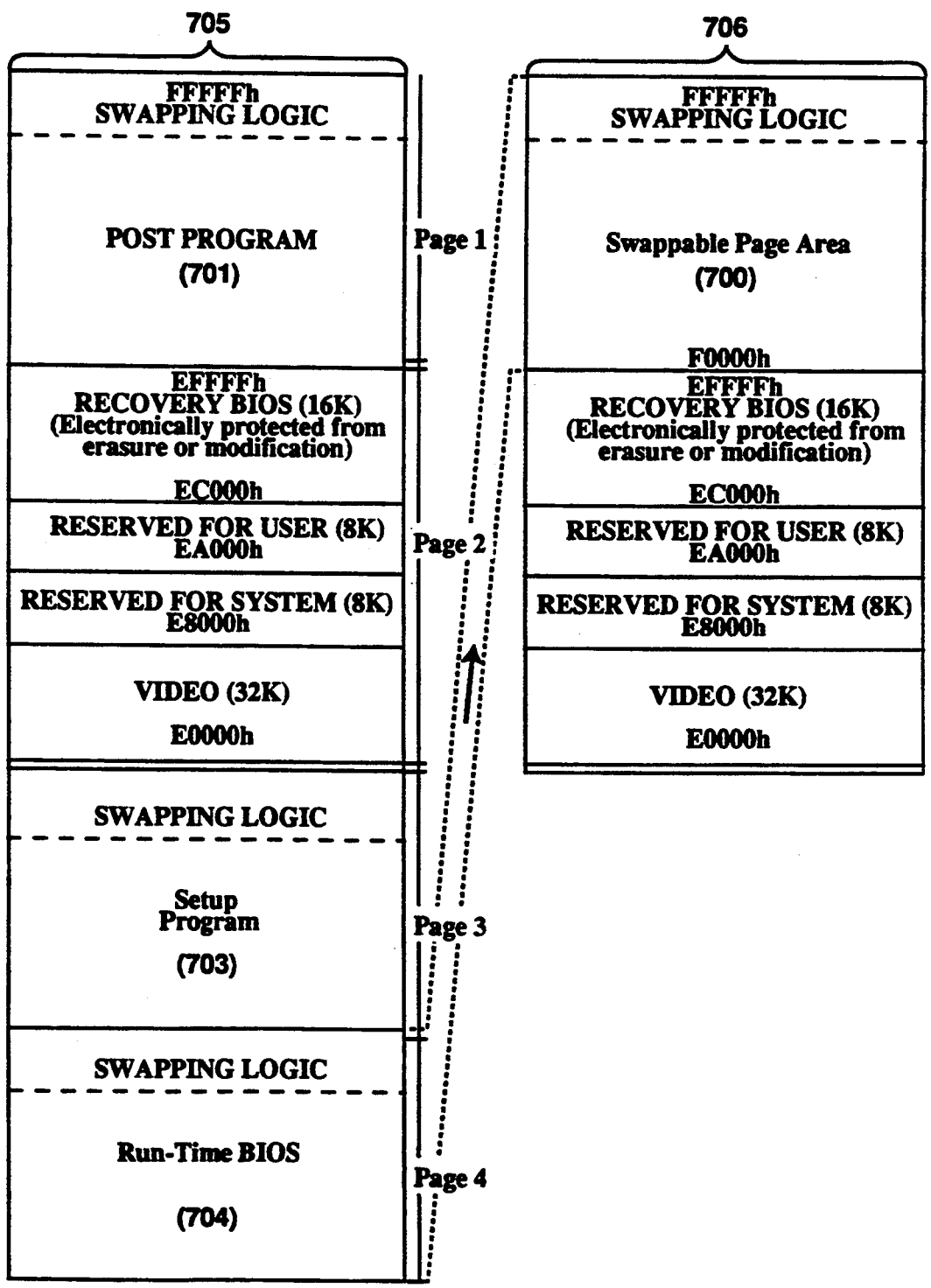

In the Page 4 example shown in FIG. 3b, a Page 4 value of 0 Ch is used to redirect a processor 101 access to the flash memory address range C0000h through CFFFFh. Again, the redirection to address range C0000h through CFFFFh is only provided by way of example. Note also that the processor 101 is aware only of loading the page register and accessing the swappable page area (F0000h through FFFFFh) in flash memory 103. The processor 101 is not aware of the redirection of the high order processor address. The Page 4 case is illustrated in FIG. 7d.

In the last two examples shown in FIG. 3b, processor 101 accesses a non-swappable page area (i.e. area 301) so the address is not modified. In the first of these examples, processor 101 presents an address in the range E0000h through EFFFFh on lines 210. Since such an address is not in the swappable page area; therefore, the value in page register 214 becomes irrelevant. In this case, the page decoder 217 simply passes the processor address through to the flash memory 103. Thus, the address in the range E0000h through EFFFFh is presented to flash memory on lines 219. Similarly, a processor address in the range 0 through DFFFFh is presented unmodified to the bus 100.

In this manner, addresses output by processor 101 on lines 211 and 212 may be modified and redirected to the selected page of flash memory 103. It will be apparent to those skilled in the art that FIGS. 3a and 3b describe a modification of only four high order processor address lines, however, additional high order address lines or bits may be included in the manipulation by page decoder 217 in order to provide access to additional pages of BIOS. It will also be apparent to those skilled in the art that the swappable page area address range (F0000h through FFFFFh) used in the preferred embodiment to trigger the swapping operation for the system BIOS may be implemented at any memory range. Thus, the paging hardware of the present invention is described.

Processing logic for controlling the paged nonvolatile memory system of the present invention is also included. This processing logic falls into two distinct parts: 1) part one code or page selection logic and 2) part two code or swapping logic. Part one code is the processing logic that determines the page number that should be swapped into the region corresponding to the swappable page area. The part two code of the page control processing logic is the code that performs the switch or swapping to the next page. Part one code may reside anywhere within the BIOS or a swappable page. Part two code is located in the physical address range corresponding to the upper 8K of each swappable page. For example, the part two swapping logic for Page 1 resides in region 315 as shown in FIG. 2. Similarly, the part two swapping logic for Page 3 resides in region 310. This upper 8K address range corresponds to a compatibility section for the IBM PC where there are fixed entry points to various software interrupts and other fixed data regions. Between the fixed entry points and data regions are gaps of available memory. The part two swapping logic is positioned in one of these gaps. The part two swapping logic is always positioned at the same fixed address relative to each page. Each swappable page must: have part two swapping logic. It will be apparent to those skilled in the art that the swapping logic for other computer system architectures may be located at a different position within the swappable pages, but at the same fixed addresses relative to each page.

Figure 4:
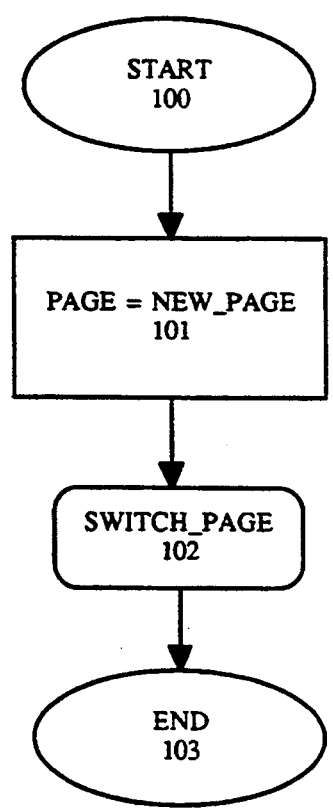
FIGS. 4-6 are flow charts of the paging processing logic of the present invention.

Page switching in the present invention is activated by executing part one page selection processing logic. In the preferred embodiment, part one processing logic is executed by code in another page or via the activation of a distinctive sequence of alpha-numeric keystrokes. A particular keystroke sequence may be associated with each page. In the preferred embodiment, for example, Page 1 contains a power-on self test (POST) program. Page 1 with POST code is automatically selected on power-up or system reset. Page 3 contains set-up processing logic and Page 4 contains the run-time BIOS logic. The set-up page of Page 3 may be selected from the POST processing logic upon the occurrence of a configuration error. Thus, POST processing logic prompts for an alphanumeric keystroke to execute part one page selection code when requested. The set-up page or Page 3 is passed by the POST code or run-time code to the part one page selection code. Part one page selection code is illustrated in the flow chart of FIG. 4. Similarly, on the normal termination of power on self test logic, the POST processing code may execute part one page selection code to activate the run-time BIOS of Page 4. Thus, part one page selection code as illustrated in FIG. 4 is executed after being passed the run time BIOS page number (Page 4). Also, a particular alpha-numeric sequence such as F1 or control all insert (CTRL-ALT-INS) can be used to trigger the activation of part one page selection code. Such an alpha-numeric sequence is used to enter a setup page. The part one page selection logic and the part two swapping logic is listed herein in a section just prior to the Claims section.

Referring now to FIG. 4, the part one page selection logic of the present invention is illustrated. As described above, several methods are available for activating the processing logic illustrated in FIG. 4. Once activated, the logic starting at bubble 100 in FIG. 4 is executed. In processing block 101, the desired new page (NEW_PAGE) is loaded into a general purpose register of the processor for transfer to the part two swapping logic. Part two swapping logic is activated in processing block 102 via a software jump by executing a software jump instruction (JMP) provided in the processor instruction set. A software jump instruction (JMP) is well known in the art. Once the software jump in processing block 102 is executed, the part two swapping logic starting at bubble 500 in FIG. 5 is executed.

Figure 5:
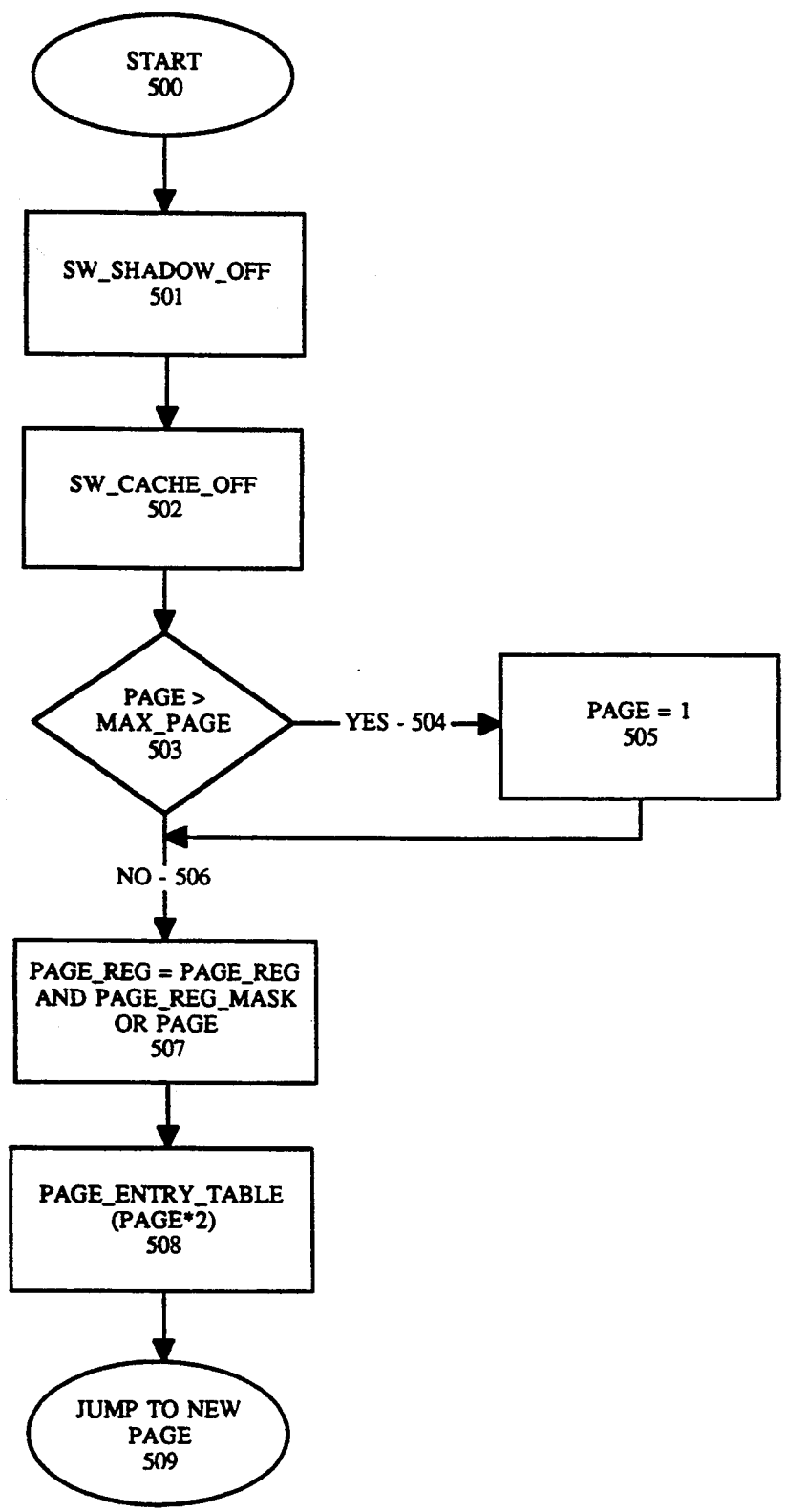

Referring now to FIG. 5, the part two swapping logic of the present invention is illustrated. In the preferred embodiment, two procedures (SW_SHADOW_OFF and SW_CACHE_OFF) are initially o called in processing block 501 and 502 in order to disable the potential of multiple copies of the code of the current page. Other copies of the code in the current page may be held by the processor in a shadow region or a cache region. Means for enabling and disabling shadow and cache regions are well known in the art. The desired destination page number is passed to part two swapping logic through an internal general purpose processor register. This page number is compared with a maximum page number in decision block 503 in order to determine if the requested page is outside the limit of available pages. If the requested page is outside the available limit (processing path 504), the requested page is set to Page 1 (processing block 505) and control continues at processing block 507. If, however, the requested page is within limits (processing path 506), the requested page is not modified. In processing block 507, the page register is loaded with the requested page. This action initializes the hardware component of the present invention as described earlier.

Once the page register is loaded with the appropriate page value, the entry point address associated with the new page is retrieved from a page entry table in processing block 508. Control is then transferred to the new page at the appropriate entry point in bubble 509.

Figure 6:
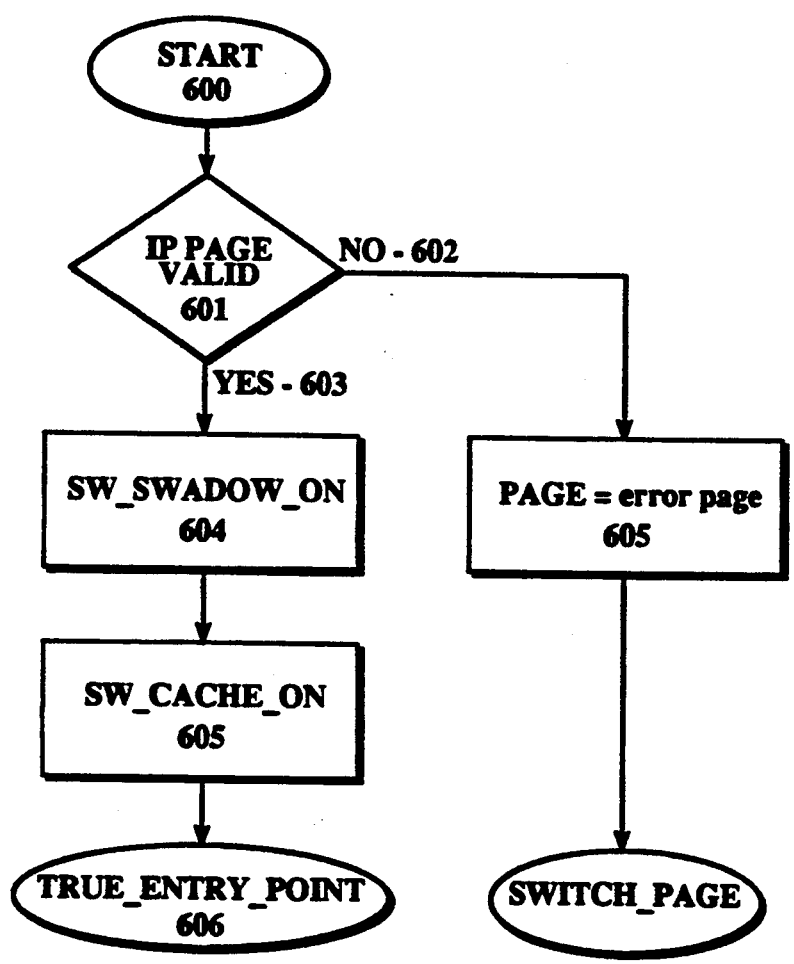

Referring now to FIG. 6, the processing logic at the entry point of each page is illustrated. This processing logic performs several page initialization steps prior to transferring control to the actual system software entry point (TRUE_ENTRY_POINT) in processing bubble 606. In decision block 601, a test is performed to determine if the page to which control has been transferred is a valid page. A data item in each page containing a distinctive value is used to verify that the active page contains valid code. If this is not the case (processing path 602), control transfers to processing block 605 where an error page is loaded into the requested page register and the part two swapping logic is again activated to transfer control to a page for processing the error. If, however, the page is valid (processing path 603), the shadowing and cacheing functions are enabled in processing blocks 604 and 605 and control is transferred to the system software entry point for the new page.

In an alternative embodiment of the present invention, processing logic may be stored in a non-volatile memory device in a paged form as described above. Before execution, however, the processing logic thus stored may be copied from the non-volatile memory device to a random access device (RAM) for execution out of RAM. In this manner, non-volatile processing logic may be retained in flash memory but executed more quickly as a non-paged RAM executable.

In another alternative embodiment of the present invention, several different forms of configuration information may be provided in different pages of flash memory. Any such page of configuration information may be accessed by selecting the appropriate page number. Configuration information in this form may include EISA configuration data. EISA is an extension of the bus protocol of IBM PC computer systems. EISA protocol and associated data is well known in the art.

In the prior art, computer systems store EISA configuration data in a non-volatile random access memory device (RAM) such as CMOS RAM. These CMOS devices require a battery to retain data. Using the present invention, a non-volatile memory device such as flash memory may be used to retain EISA configuration data without the need for CMOS and the associated battery. Referring to FIG. 2, the memory areas 307 and/or 308 in static page 2 may be used for storage of EISA configuration data. When writing the EISA configuration data to memory, the system BIOS must be modified to erase flash memory areas 307 and/or 308 and to store EISA configuration data into this flash area instead of a CMOS RAM. When reading the EISA configuration data from memory, the system BIOS must be modified to access flash memory instead of a CMOS RAM. A process for updating the flash memory device with EISA configuration data is described below in relation to FIG. 8. In this manner, the use of CMOS for storage of EISA configuration data can be eliminated while retaining the flexibility of a configurable EISA protocol. If CMOS is used for purposes other than storage of EISA configuration data or the elimination of CMOS is not desirable, flash memory may serve as a non-volatile backup for the contents of CMOS. Thus, a copy of the contents of CMOS may be retained in the flash memory device in order to recover from a CMOS battery failure.

Figure 8:
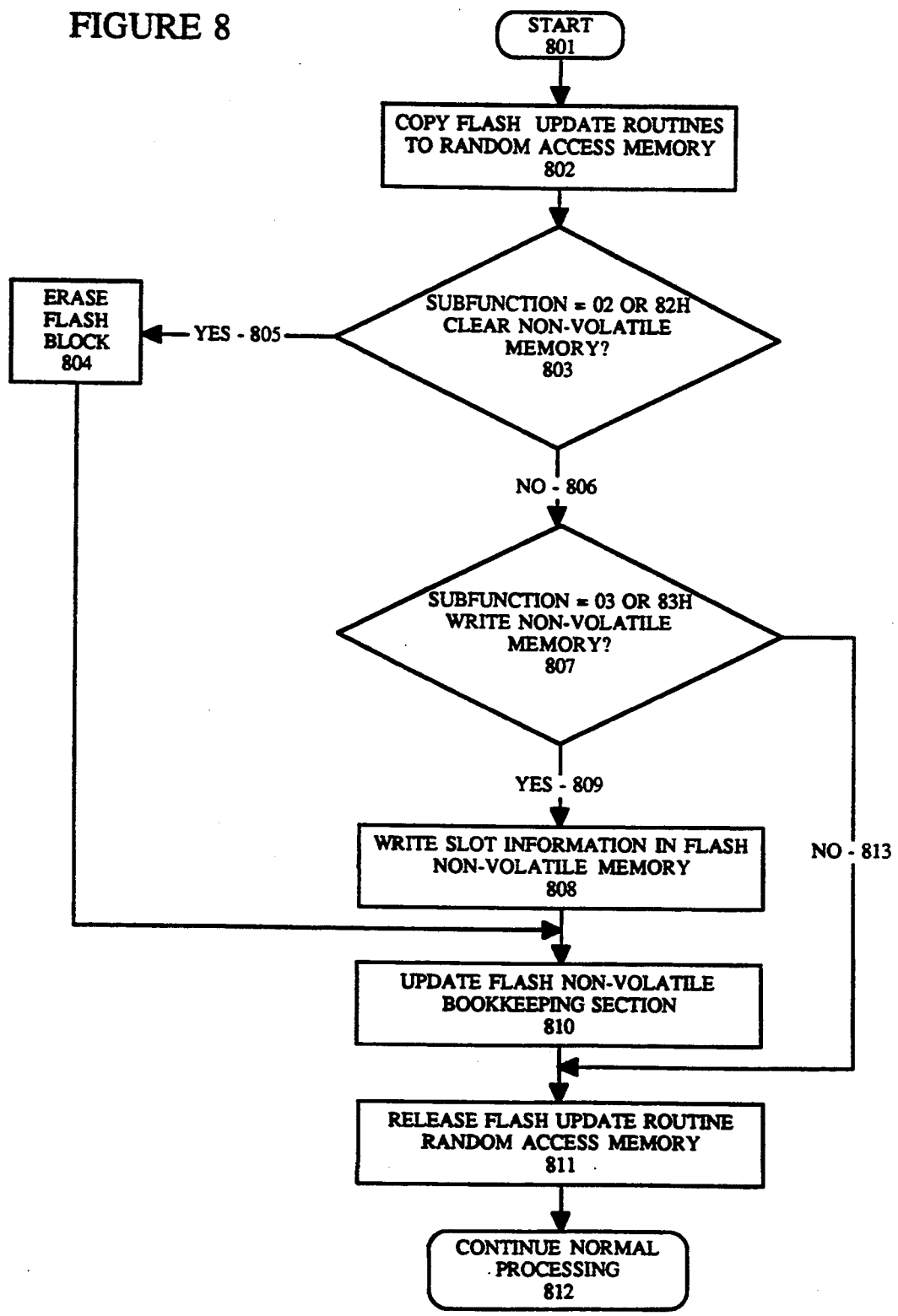
FIG. 8 illustrates processing logic for updating a flash memory device with EISA configuration data.

Referring now to FIG. 8, processing logic for updating the flash memory device with configuration data, such as EISA information, is illustrated. It will be apparent to those skilled in the art that the configuration data update process of the present invention may be used with configuration information other than EISA information. The processing logic shown in FIG. 8 resides in the system BIOS of the preferred embodiment. This logic is activated by an EISA configuration utility, another configuration data update utility, an operating system, or other BIOS function. The processing logic starting at block 801 is executed upon activation of a software interrupt (INT 15). The use of an INT 15 interrupt is well known in the art. On activation of the logic starting at block 801, a parameter is input indicating the subfunction operation to perform. These subfunction operations include a "clear non-volatile memory block" operation that erases the configuration data flash memory block and a "write non-volatile memory block" operation used to program the configuration data flash memory block with new configuration data.

After activation of the flash memory configuration data update function starting at block 801, a set of update functions are copied out of the flash BIOS area and into a random access memory (RAM) area for execution (processing block 802). These update routines are maintained in the BIOS itself in order to accomodate hardware specific operations with non-volatile memory in particular computer systems. The update routines must be copied out of the BIOS flash memory for execution, since non-volatile memory devices may not support both read and write operations in the same sequence of execution. If a memory shadowing capability is available, the operation of copying the update utilities out of flash memory and into RAM may not be necessary. Similarly, the operation of releasing the RAM area (processing block 811) would not be necessary if shadowing is available.

Once the flash update routines are copied into RAM, if necessary, decision block 803 is executed to interpret the input subfunction selection. If a "clear non-volatile memory block" operation is selected (processing path 805), an erase flash memory block routine is executed in processing block 804. If a "write non-volatile memory block" is selected (processing path 809), a write flash memory block routine is executed in processing block 808 to write slot information into the flash memory configuration data block. If another command is selected (processing path 813), RAM allocated for the update routines is released (processing block 811) and the configuration data update logic terminates at block 812.

Once an erase or write operation is completed, the locations in the configuration data block actually updated are recorded (processing block 810) in a bookkeeping data area. Because a previously erased location in the configuration data block can only be written once, the bookkeeping data must be maintained in order to ensure that a particular location is not written more than once. Having recorded the erase or write operation, the RAM area reserved for the flash update routines, if necessary, is released in processing block 811. Normal BIOS processing is then resumed at termination block 812. Thus, configuration data including EISA information may be stored and updated in an area of a non-volatile memory device.

In the same way that EISA configuration data may be retained in the flash memory device, other types of information, processing logic, or data may be saved in non-volatile memory. These other types of information include, but are not limited to, other bus protocol information, network information, and/or computer system identification numbers. Several types of identification numbers must be retained for individual computer systems. One such number is an Ethernet address. Ethernet is a well known network architecture and protocol for which a unique network address must be stored in each computer system. In the prior art, a unique hardware component containing the Ethernet address for that system is installed into each computer. As shown in FIG. 2, the unique Ethernet address may be stored in a page of flash memory, such as area 306 in static page 2, without the need for unique hardware. The protected area 306 in static page 2 cannot be erased or altered once the device is installed; thus, the Ethernet address cannot be destroyed. Similarly, other computer system identification numbers such as unique serial numbers, printed board assembly (PBA) numbers or operating system license numbers may be stored in an area of flash memory.

Thus, a computer system is described wherein a paging technique is used to expand the useable non-volatile memory capacity beyond a fixed address space limitation.

Although the invention has been described herein with reference to a specific embodiment, many modifications and variations therein will readily occur to those skilled in the art. Accordingly, all such variations and modifications are included within the intended scope of the present invention as defined by the following claims.

```
PART 1 - Page Selection code:
    MOV      AH,NEW_PAGE              ;switch to next page
    EXTRN    SWITCH_PAGE:NEAR         ;switch page
    JMP      SWITCH_PAGE
PART 2 - Swapping code:
    PUBLIC SWITCH_PAGE
SWITCH_PAGE PROC
ENTRY REGISTERS:
    AH = Page to switch to
EXIT REGISTERS:
    None-all assumed to be destroyed
COMMENTS:
    1.  IF AH exceeds maximum valid page the page O is the default page.
    2.  This example assumes 16 pages
    3.  SW_SHADOW_OFF, SW_CACHE_OFF, SW_SHADOW_ON,
        SW_CACHE_ON, PAGEx_ENTRY_POINT are all within the physical
        address range FE000H to FFFFFH. They may or may not be dummy
        routines depending upon the current page.
    PUSH     AX                       ;save new page number
    CALL     SW_SHADOW_OFF            ;turn off all shadowing
    CALL     SW_CACHE_OFF             ;turn off all caching
    POP      AX
    MOV      BX,OFFSET SWITCH_TABLE
    CMP      AH,MAX_PAGE              ;check if page is valid
    JBE      CHK_PAG1                 ;valid
    MOV      AH, 0                    ;force POST PAGE
    MOV      DX, SWITCH_REG           ;get hardware register that
                                      switches
                                      ;pages
```

-continued

```
IN          AL, DX                          ;get current reading
AND         AL, SWITCH_REG_MASK             ;delete all page bits
                                            preserving
                                            ;other bits
OR          AL,AH                           ;or in new page
OUT         DX,AL                           ;switch page
NOP                                         ;do a couple of NOPs to let
                                            everything
NOP                                         ;settle down
ADD         BL, AH
ADD         BL, AH                          ;table entries are word
                                            values
JMP         CS:BX                           ;jump to page entry point
SWITCH_TABLE DW OFFSET PAGE0_ENTRY_POINT
             DW OFFSET PAGE1_ENTRY_POINT
             DW OFFSET PAGE2_ENTRY_POINT
             DW OFFSET PAGE3_ENTRY_POINT
             DW OFFSET PAGE4_ENTRY_POINT
             DW OFFSET PAGE5_ENTRY_POINT
             DW OFFSET PAGE6_ENTRY_POINT
             DW OFFSET PAGE7_ENTRY_POINT
             DW OFFSET PAGE8_ENTRY_POINT
             DW OFFSET PAGE9_ENTRY_POINT
             DW OFFSET PAGE10_ENTRY_POINT
             DW OFFSET PAGE11_ENTRY_POINT
             DW OFFSET PAGE12_ENTRY_POINT
             DW OFFSET PAGE13_ENTRY_POINT
             DW OFFSET PAGE14_ENTRY_POINT
             DW OFFSET PAGE15_ENTRY_POINT
SWITCH_PAGE ENDP
SW_SHADOW_OFF   PROC
    ;varies depending upon hardware and current page
    RET
SW_SHADOW_OFF   ENDP
SW_CACHE_OFF    PROC
    ;varies depending upon hardware and current page
    RET
SW_CACHE_OFF    ENDP
SW_SHADOW_ON    PROC
    ;varies depending upon hardware and current page
    RET
SW_SHADOW_ON    ENDP
SW_CACHE_ON     PROC
    ;varies depending upon hardware and current page
    RET
SW_CACHE_ON     ENDP
PAGEx_ENTRY_POINT    PROC
;If valid then code is as follows:
    CALL        SW_SHADOW_ON
    CALL        SW_CACHE_ON
    EXTRN       TRUE_ENTRY_POINT:NEAR
    JMP         TRUE_ENTRY_POINT
;If switch not valid for any reason, i.e. cannot go from page x to y
;directly, then code is as follows
    MOV         AH, error_page
    JMP         SWITCH_PAGE
PAGEx_ENTRY_POINT    ENDP
```

We claim:

1. In a computer system having a processor and a programmable non-volatile memory device, a memory paging system comprising:
  means for selecting a page of non-volatile memory, said page corresponding to an area in said non-volatile memory device, said page being pre-defined as a swappable or a non-swappable page;
  means for receiving address signals from said processor directed to said non-volatile memory device;
  means for modifying said address signals to access a swappable page selected by said means for selecting by replacing a predetermined quantity of said received address signals with an address value of a page selected by said means for selecting, said means for modifying further including swapping logic for controlling access to said page selected by said means for selecting, said swapping logic disposed within said page selected by said means for selecting;
  means for preventing modification of address signals if a non-swappable page is selected by said means the selecting; and
  means for updating the contents of a page of said non-volatile memory device using update processing logic stored in said non-volatile memory device, the updated contents of said page being retained following a power down of said non-volatile memory device.

2. The paging system as claimed in claim 1 wherein said non-volatile memory device is a flash memory device.

3. The paging system as claimed in claim 1 wherein said means for selecting is a programmable page register located in said computer system.

4. The paging system as claimed in claim 1 wherein said means for receiving includes means for receiving only a predetermined quantity of higher order address signals.

5. The paging system as claimed in claim 1 wherein said predetermined quantity of address signals replaced by said means for modifying are higher order address signals.

6. The paging system as claimed in claim 1 wherein each said page contains 64K bytes.

7. The paging system as claimed in claim 1 wherein at least one page is static and non-swappable.

8. The paging system as claimed in claim 1 wherein said non-volatile memory device contains pages of basic input/output system (BIOS) processing logic.

9. The paging system as claimed in claim 1 wherein said means for selecting a page further includes means for receiving command input from an input device coupled to said computer system, said command input associated with a page selection.

10. The paging system as claimed in claim 1 wherein at least one said page contains configuration or identification information.

11. In a computer system having a processor and a programmable non-volatile memory device, a process for paging said non-volatile memory device, said process comprising the steps of:
  selecting a page of non-volatile memory, said page corresponding to an area in said non-volatile memory device, said page being pre-defined as a swappable or a non-swappable page;
  receiving address signals from said processor directed to said non-volatile memory device;
  modifying said address signals to access a swappable page selected in said step of selecting by replacing a predetermined quantity of said received address signals with an address value of a page selected by said means for selecting, said step of modifying further including a step of accessing swapping logic for controlling access to said page selected by said means for selecting, said swapping logic disposed within said page selected by said means for selecting;
  preventing modification of address signals if a non-swappable page is selected in said selecting step; and
  updating the contents of a page of said non-volatile memory device using update processing logic stored in said non-volatile memory device, the updated contents of said page being retained following a power down of said non-volatile memory device.

12. The process as claimed in claim 11 wherein said selecting step includes a step of loading a programmable page register located in said computer system.

13. The process as claimed in claim 11 wherein said receiving step includes a step of receiving only a predetermined quantity of higher order address signals.

14. The process as claimed in claim 11 wherein said modifying step includes a step of reading a page selected in said selecting step.

15. The process as claimed in claim 11 wherein in said modifying step said predetermined quantity of address signals are higher order address signals.

16. The process as claimed in claim 11 wherein each said page contains 64K bytes.

17. The process as claimed in claim 11 including a step of determining if said page selected in said selecting step is a static and non-swappable page.

18. The process as claimed in claim 11 wherein said non-volatile memory device contains pages of basic input/output system (BIOS) processing logic.

19. The process as claimed in claim 11 wherein said selecting step further includes a step of receiving command input from an input device coupled to said computer system, said command input associated with a page selection.

20. The process as claimed in claim 11 wherein at least one said page contains configuration or identification information.

21. The process as claimed in claim 11 wherein at least one said page contains Extended Industry Standard Architecture (EISA) information.

22. The process as claimed in claim 11 wherein at least one said page contains Ethernet address information.

23. The process as claimed in claim 11 wherein at least one said page contains serial number information.

24. The process as claimed in claim 11 including a step of updating a portion of said non-volatile memory device with configuration or identification information.

25. The process as claimed in claim 11 including a step of erasing a portion of said non-volatile memory device.

26. The process as claimed in claim 24 wherein said configuration information includes Extended Industry Standard Architecture (EISA) information.

27. The process as claimed in claim 11 including a step of saving a copy of information stored in a CMOS RAM device in said non-volatile memory device.

* * * * *

UNITED STATES PATENT AND TRADEMARK OFFICE
CERTIFICATE OF CORRECTION

PATENT NO. : 5,371,876
DATED : December 6, 1994
INVENTOR(S) : Ewertz et al.

It is certified that error appears in the above-indentified patent and that said Letters Patent is hereby corrected as shown below:

In the Title Page at [75] at line 3 delete "Gabe" and insert --Gabel--

In column 2 at line 5 delete "model" and insert --modern--

In column 2 at line 43 delete "oilier" and insert --other--

In column 4 at line 54 delete "tile" and insert --the--

In column 9 at line 5 delete "all" and insert --alt--

Signed and Sealed this

Thirteenth Day of May, 1997

*Attest:*

BRUCE LEHMAN

*Attesting Officer*    *Commissioner of Patents and Trademarks*